United States Patent
Recio, III et al.

(10) Patent No.: US 11,668,169 B2
(45) Date of Patent: *Jun. 6, 2023

(54) REACTIVE SURFACTANT FLOODING AT NEUTRAL PH

(71) Applicant: Halliburton Energy Services, Inc., Houston, TX (US)

(72) Inventors: Antonio Recio, III, Houston, TX (US); Enrique Antonio Reyes, Houston, TX (US); Aaron Michael Beuterbaugh, Houston, TX (US); Ronald Oliver Bosch, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,739

(22) Filed: Nov. 16, 2021

(65) Prior Publication Data

US 2022/0162929 A1 May 26, 2022

Related U.S. Application Data

(60) Provisional application No. 63/117,835, filed on Nov. 24, 2020.

(51) Int. Cl.
*E21B 43/16* (2006.01)
*C09K 8/584* (2006.01)

(52) U.S. Cl.
CPC .............. *E21B 43/16* (2013.01); *C09K 8/584* (2013.01)

(58) Field of Classification Search
CPC ...................................................... E21B 43/16
See application file for complete search history.

(56) References Cited

U.S. PATENT DOCUMENTS

| 4,747,974 A | 5/1988 | Ritter |
| 5,019,343 A | 5/1991 | Hwa et al. |

(Continued)

FOREIGN PATENT DOCUMENTS

| CN | 103224776 A | 7/2013 |
| WO | 2014193720 A1 | 12/2014 |

(Continued)

OTHER PUBLICATIONS

Foreign Communication from Related Application—International Search Report and Written Opinion of the Internationa Searching Authority, International Application No. PCT/US2021/059645, dated Mar. 8, 2022, 11 pages.

(Continued)

*Primary Examiner* — William D Hutton, Jr.
*Assistant Examiner* — Avi T Skaist
(74) *Attorney, Agent, or Firm* — Conley Rose, P.C.; Rodney B. Carroll (57) ABSTRACT

A method of enhanced oil recovery comprising introducing into one or more injection wells located within a subterranean formation a treatment fluid comprising (i) an aminopolycarboxylic acid comprising a phosphonoalkyl moiety; and ii) a surfactant blend; and removing hydrocarbons from one or more production wells. A method of enhanced oil recovery comprising introducing into one or more injection wells located within a subterranean formation a treatment fluid comprising (i) an aminopolycarboxylic acid comprising a phosphonoalkyl moiety; and ii) a surfactant blend wherein the subterranean formation comprises non-source rock, naturally-fractured rock, low porosity rock, calcite rich reservoir rock or a combination thereof; and removing hydrocarbons from one or more production wells.

28 Claims, 4 Drawing Sheets

(56) References Cited

U.S. PATENT DOCUMENTS

| | | | |
|---|---|---|---|
| 5,171,460 | A | 12/1992 | Underdown |
| 6,716,799 | B1 | 4/2004 | Mueller et al. |
| 9,033,033 | B2 | 5/2015 | Thomas et al. |
| 9,670,397 | B2 | 6/2017 | Ghumare et al. |
| 10,711,181 | B2 | 7/2020 | Beuterbaugh et al. |
| 2009/0084554 | A1 | 4/2009 | Williamson et al. |
| 2016/0024372 | A1 | 1/2016 | Fathi Najafabadi |
| 2016/0032174 | A1 | 2/2016 | Fuller et al. |
| 2016/0200969 | A1* | 7/2016 | Reichenbach-Klinke ............ C08K 5/3435 524/718 |
| 2017/0240797 | A1 | 8/2017 | Lablanc et al. |
| 2018/0258342 | A1 | 9/2018 | Nguyen et al. |
| 2018/0273832 | A1 | 9/2018 | Lablanc et al. |
| 2019/0264097 | A1 | 8/2019 | Dusterhoft et al. |
| 2019/0277112 | A1 | 9/2019 | Beuterbaugh et al. |
| 2020/0056087 | A1 | 2/2020 | Nizamidin et al. |
| 2020/0190396 | A1 | 6/2020 | Reyes et al. |
| 2021/0355370 | A1* | 11/2021 | Recio, III ............ C09K 8/584 |

FOREIGN PATENT DOCUMENTS

| | | | |
|---|---|---|---|
| WO | 2016195653 | A1 | 12/2016 |
| WO | 2013005095 | A1 | 3/2019 |
| WO | 2020028567 | A1 | 2/2020 |
| WO | 2020101644 | A1 | 5/2020 |
| WO | 2020101649 | A1 | 5/2020 |
| WO | 2020101719 | A1 | 5/2020 |
| WO | 2020117269 | A1 | 6/2020 |

OTHER PUBLICATIONS

Foreign Communication from Related Application—International Search Report and Written Opinion of the Internationa Searching Authority, International Application No. PCT/US2021/059647, dated Mar. 8, 2022, 11 pages.

Foreign Communication from Related Application—International Search Report and Written Opinion of the Internationa Searching Authority, International Application No. PCT/US2021/059650, dated Mar. 17, 2022, 12 pages.

Recio III, Antonio et al., Filing Receipt, Specification and Drawings for U.S. Appl. No. 63/117,832, filed Nov. 24, 2020, titled "Method for Improved Oil Recovery in Subterranean Formations With Circumneutral pH Flood," 24 pages.

Beuterbaugh, Aaron et al., Filing Receipt, Specification and Drawings for U.S. Appl. No. 63/117,834, filed Nov. 24, 2020, titled "Composition and Methods for Improving Hydrocarbon Mobility in Enhanced Oil Recovery Operations," 26 pages.

Recio III, Antonio et al., Filing Receipt, Specification and Drawings for U.S. Appl. No. 63/117,835, filed Nov. 24, 2020, titled "Reactive Surfactant Flooding at Neutral pH," 26 pages.

Dusterhoft, Ronald Glen, Filing Receipt, Specification and Drawings for U.S. Appl. No. 63/117,837, filed Nov. 24, 2020, titled "Enhanced Oil Recovery Harvesting for Fractured Reservoirs," 30 pages.

Benoit, Denise et al., Filing Receipt, Specification and Drawings for U.S. Appl. No. 63/117,839, filed Nov. 24, 2020, titled "Method for Improved Oil Recovery in Unconventional Subterranean Formations," 21 pages.

Benoit, Denise Nicole et al., Filing Receipt, Specification and Drawings for U.S. Appl. No. 63/117,842, filed Nov. 24, 2020, titled "Fluids for Single and Multi Pad Delivery," 34 pages.

Recio III, Antonio et al., Filing Receipt, Specification and Drawings for U.S. Appl. No. 17/527,736, filed Nov. 16, 2021, titled "Method for Improved Oil Recovery in Subterranean Formations With Circumneulial pH Flood," 60 pages.

Dusterhoft, Ronald Glen, Filing Receipt, Specification and Drawings for U.S. Appl. No. 17/527,743, filed Nov. 16, 2021, titled "Enhanced Oil Recovery Harvesting for Fractured Reservoirs," 58 pages.

Benoit, Denise Nicole et al., Filing Receipt, Specification and Drawings for U.S. Appl. No. 17/527,746, filed Nov. 16, 2021, titled "Fluids for Single and Multi Pad Delivery," 49 pages.

Electronic Acknowledgment Receipt, Specification and Drawings for International Patent Application No. PCT/US2021/59645, entitled "Method for Improved Oil Recovery in Subterranean Formations With Circumneutral Ph Flood," filed Nov. 17, 2021, 58 pages.

Electronic Acknowledgment Receipt, Specification and Drawings for International Patent Application No. PCT/US2021/59647, entitled "Reactive Surfactant Flooding at Neutral pH," filed Nov. 17, 2021, 56 pages.

Electronic Acknowledgment Receipt, Specification and Drawings for International Patent Application No. PCT/US2021/59650, entitled "Enhanced Oil Recovery Harvesting for Fractured Reservoirs," filed Nov. 17, 2021, 57 pages.

Kumar, Ashish et al., "Well Interference Diagnosis through Integrated Analysis of Tracer and Pressure Interference Tests," Unconventional Resources Technology Conference, Jul. 23-25, 2018, 12 pages.

Mahmoud, M.A. et al., "Chelating-Agent Enhanced Oil Recovery for Sandstone and Carbonate Reservoirs," Society of Petroleum Engineers, Jun. 2015, pp. 483-495, Society of Petroleum Engineers.

Hassan, Amjed M. et al., "Surface Charge Study of EDTA Interaction with Carbonate Rock During Chelating Agent Flooding," Journal of Petroleum Science and Engineering, Mar. 10, 2020, vol. 191, pp. 1-14, Elsevier.

Horeh, Mohsen Bahaloo et al., "Role of Brine Composition and Water-Soluble Components of Crude Oil on the Wettability Alteration of a Carbonate Surface," Energy & Fuels, 2019, vol. 33, pp. 3979-3988, ACS Publications.

Li, Wenhao et al., "Porosity Enhancement Potential through Dolomite Mineral Dissolution i the Shale Reservoir; A Case Study of an Argillaceous Dolomite Reservoir in the Jianghan Basin," Energy & Fuels, 2019, vol. 33, pp. 4857-4864, ACS Publications.

Austad, T. et al., "Low Salinity EOR Effects in Limestone Reservoir Cores Containing Anhydrite; A Discussion of the Chemical Mechanism," Energy & Fuels, Sep. 23, 2015, vol. 29, pp. 6903-6911, ACS Publications.

Zhang, Fan et al., "Hercules: Final Report," Feb. 14, 2020, 42 pages, Harold Vance Department of Peroleum Engineering.

"Quarterly Report," Mar. 31, 2016, 31 pages, United States Securities and Exchange Commission.

Office Action dated Feb. 1, 2023 (24 pages), U.S. Appl. No. 17/527,736, filed Nov. 16, 2021.

Office Action dated Feb. 13, 2023 (21 pages), U.S. Appl. No. 17/527,746, filed Nov. 16, 2021.

* cited by examiner

REACTIVE SURFACTANT FLOODING AT NEUTRAL PH

CROSS-REFERENCE TO RELATED APPLICATIONS

This application claims priority under 35 U.S.C. § 119(e) to U.S. Provisional Patent Application No. 63/117,835 filed on Nov. 24, 2020 and entitled "Reactive Surfactant Flooding at Neutral pH," the disclosure of which is hereby incorporated herein by reference in its entirety.

TECHNICAL FIELD

This application relates to the recovery of natural resources from a wellbore penetrating a subterranean formation, and more specifically this application relates to compositions and methods used in improved or enhanced oil recovery (EOR) operations.

BACKGROUND

Natural resources such as gas, oil, and water residing in a subterranean formation or zone are usually recovered by drilling a wellbore down to the subterranean formation. Primary recovery refers to the first stage of hydrocarbon production, in which natural reservoir energy displaces hydrocarbons from the reservoir into the wellbore. Initially, the reservoir pressure is considerably higher than the bottomhole pressure inside the wellbore. This high natural differential pressure drives hydrocarbons toward the well and up to surface. However, as the reservoir pressure declines because of production, so does the differential pressure. To reduce the bottomhole pressure or increase the differential pressure to increase hydrocarbon production, it typically becomes necessary to implement an artificial lift system, such as a rod pump, an electrical submersible pump or a gas-lift installation. The primary recovery stage reaches its limit either when the reservoir pressure is so low that the production rates are not economical, or when the proportions of gas or water in the production stream are too high. During primary recovery, only a small percentage of the initial hydrocarbons in place are produced, typically around 10% for oil reservoirs. Following primary recovery, a variety of improved or enhanced oil recovery (EOR) methods may be employed to recover additional amounts of hydrocarbons from the wellbore and surrounding subterranean formation.

Figure 1:
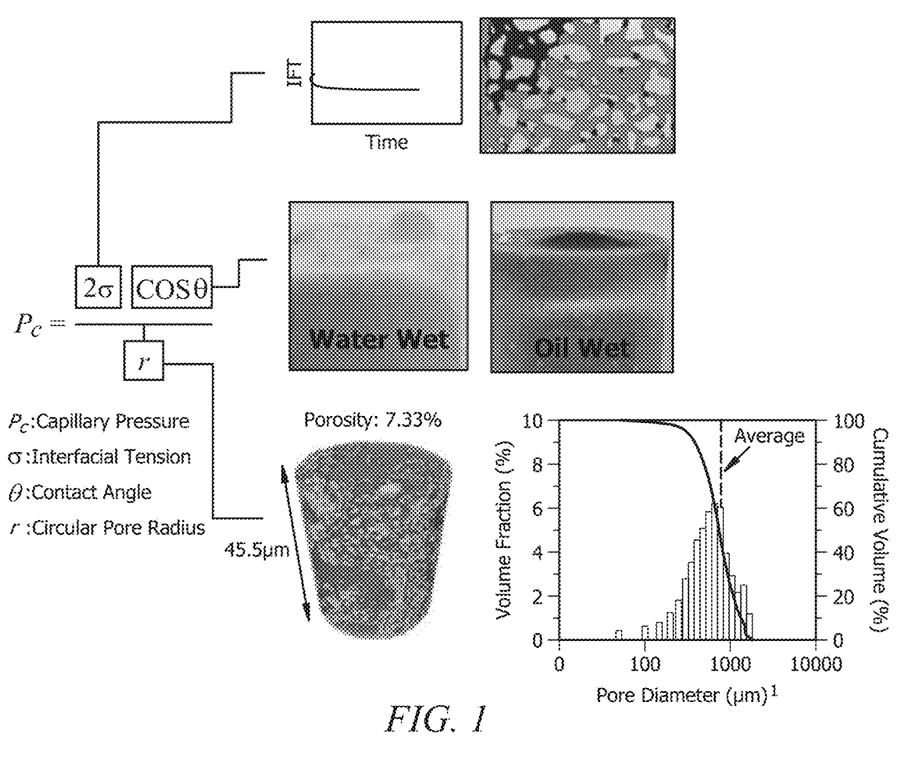
FIG. 1 is the Young-LaPlace model for calculation of capillary pressure.

One such method of EOR utilized low pH applications for mineral dissolution (acidizing-type) but were shown to lead to increased formation damage and loss of rock integrity issues resulting in less than desirable hydrocarbon recovery totals. Another methodology for EOR involves altering the capillary pressure in the reservoir. Herein, the capillary pressure, $P_c$, refers to the difference in pressure across the interface between two immiscible fluids, say oil and water, in the reservoir. The Young-LaPlace relation provides a model for defining the significant parameters impacting capillary pressure. This relationship is depicted in FIG. 1. With respect to the efficacy of surfactant formulations, the numerator of the equation, that is the impact the surfactant formulations have on modifying the interfacial tension (fluid-fluid phenomena) and the contact angle (fluid-rock interactions) have been well studied. In contrast, the impact of modifying the radius of curvature (denominator in the model) of the pore space to help improve oil recovery needs further investigation.

An ongoing need exists for novel compositions and methods for improved hydrocarbon recovery.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

A major goal when placing wells on a tertiary recovery program is obtaining a stable, aqueous-based fluid capable of sufficiently perturbing the relevant emulsification properties of the hydrocarbon trapped in both natural fractures and adjacent matrices such that an ideal displacement efficiency is achieved. Another goal is in order to displace the more difficult to access hydrocarbon, as well as remediate any damage (e.g., oil wetting of the formation due to asphaltene deposition) resultant from primary and secondary production operations, the aqueous-based fluid must also be able to convert the wettability of the formation from oil-wet to water-wet.

Disclosed herein are treatment fluids that when introduced into a subterranean formation containing hydrocarbon-based fluids facilitates recovery of the hydrocarbons or primary recovery. In some embodiments, the subterranean formation has been subjected to one or more activities or operations for the recovery of hydrocarbon resources prior to introduction of the treatment fluid. In one or more embodiments, the treatment fluid comprises (i) an aminopolycarboxylic acid (APCA) comprising a phosphonoalkyl moiety and (ii) a surfactant blend.

In some embodiments, an APCA comprising a phosphonoalkyl moiety suitable for use in a treatment fluid according to the present disclosure is a phosphonoalkyl aminopolycarboxylic acid having the general formula where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom a cobalt atom, a nickel atom, a copper atom, a gallium atom, an indium atom, or a hydrogen atom; x is 1 to 6; y is 0 to 6; and z is 1-6.

Nonlimiting examples of an APCA comprising a phosphonoalkyl moiety suitable for use in the present disclosure include N-(phosphonomethyl) iminodiacetic acid (PMIDA) or salts thereof, N-(carboxymethyl)-N-(phosphonomethyl)glycine, glycine, N,N'-1,2-ethanediylbis(N-(phosphonomethyl), glyphosine, aminotrimethylene phosphonic acid, sodium aminotris(methylenephosphonate), N-(2-hydroxyethyl)iminobis (methylphosphonic acid), phosphonic acid, P,P'-((2-propen-1-ylimino)bis(methylene)) bis-phosphonic acid, P,P',P'''-(nitrilotris(methylene))tris-(nitrilotris(methylene))trisphosphonic acid, ((methylimino)-dimethylene)bisphosphonic acid, P,P',P''',P''''-(oxybis(2,1-ethanediylnitrilobis(methylene))tetrakis-((propylimino)bis (methylene))diphosphonic acid, P,P',P'''-(nitrilotris (methylene))tris-(ethylenedinitrilo)-tetramethylenephosphonic acid, ethylene-bis (nitrilodimethylene)tetraphosphonic acid, (ethylenebis (nitrilobis(methylene)))tetrakisphosphonic acid, tetrasodium tetrahydrogen (ethane-1,2-diylbis(nitrilobis (methylene)))tetrakisphosphonate, 6-(bis(phosphonomethyl) amino)hexanoic acid, (phenylmethyl)imino)bis(methylene)bisphosphonic acid, phosphonobutane tricarboxylic acid, 2-hydroxyphosphono dicarboxylic acid, or a combination thereof. In some embodiments, the treatment fluid comprises PMIDA.

In some embodiments, the APCA comprising a phosphonoalkyl moiety is a metallated mono- or di-acetoaminophosphonate comprising a cation of Li, Na, K, Cs, Mg, Ca, Sr, Ba, Cr, Fe, Mn, Co, Ni, Cu, Ti, Zn, Zr, Ga, Al, In or, a combination thereof. In some embodiments, the APCA is a non-metallated diacetoaminophosphonate comprising a nonmetal selected from the group consisting of hydrogen ions, ammonium ions, tetraalkylammonium ions, tetraalkylphosphonium ions, a mono-, di-, or tri-alkanolamine wherein the alkyl species of the alkanol functionality can be methyl-, ethyl-, an isomer of propyl or an isomer of butyl, a nucleophile, an electrophile, a Lewis acid, a Lewis base, a Bronsted acid, a Bronsted base, an adduct of a stable complex ion, an electron donor and combinations thereof. Furthermore, under the appropriate acid/base conditions a zwitterionic species of the APCA comprising a phosphonoalkyl moiety that can form hydrogen bridges with nucleophiles, such as Lewis bases, Bronsted bases, or form adducts where an electron donor-electron acceptor pair is stable. Such species, nucleophiles or electron donor-acceptor, may comprise a monoalkanolamine, dialkanolamine or trialkanolamine for instance; where the alkyl species of the alkanol functionality can be methyl group, ethyl group, an isomer of a propyl group or a butyl group.

The APCA comprising a phosphonoalkyl moiety may be present in the treatment fluid in an amount of from about 0.01 wt. % to about 15 wt. % based on the total weight of the treatment fluid, alternatively from about 0.01 wt. % to about 5 wt. %, alternatively from about 0.25 wt. % to about 5 wt. % or alternatively from about 0.5 wt. % to about 3 wt. %.

In some embodiments, the treatment fluid comprises a surfactant blend. Any surfactant blend compatible with the other components of the treatment fluid and able to provide the disclosed characteristics may be utilized.

In some embodiments, the surfactant blend comprises a non-ionic surfactant that forms a microemulsion in situ upon contact with a hydrocarbon fluid. Herein such surfactant blends are designated Composition A. In some embodiments, Composition A comprises a sulfate salt-capped secondary propoxylated alcohol, a polyethylene glycol (PEG)-initiated polyol, an ethylene glycol additive, a diethanolamide of tall oil fatty acid, a sorbitol-initiated polyol; or a combination thereof.

In some embodiments, the surfactant blend comprises a Guerbert alcohol and is designated Composition B. Guerbet alcohols can be modified to exist as extended surfactants which refer to a class of molecules that undergo a sulfonation reaction after an alcohol has been subjected to sequential an ethylene oxide (EO) addition, followed by a propylene oxide (PO) addition, or visa versa, to attenuate the lipophilicity of the molecule.

In some embodiments, the Guerbet alcohol comprises a $C_8$ to $C_{25}$ β-alkylated dimer alcohol alkoxylated with an EO, PO, a combination of both. In such embodiments, the $C_8$ to $C_{25}$ β-alkylated dimer alcohol alkoxylated with an EO, PO, a combination of both is blocked to control oil/water solubility wherein the blocked alcohol is a product of reacting a mixture of ethylene oxide and propylene oxide of varying concentrations and the product(s) is determined by entropic and electrophilic factors. In such embodiments, blocking is accomplished by the sequential treatment of alcohols with first EO, then PO. The percent EO may range from about 10% to about 90%, and a percent PO may range from about 10% to about 90%.

Composition B may comprise a Guerbet alcohol having ethoxylate and propoxylate moieties present in a ratio of about 4:1; alternatively, about 2:1; alternatively about 1:1; alternatively about 1:2; or alternatively about 1:4. In other embodiments, the surfactant blend comprises a $C_8$ to $C_{25}$ β-alkoxylated dimer alcohol having ethoxylate and propoxylate moieties present in a ratio of from about 4:1, alternatively from about 2:1, alternatively from about 1:1, alternatively from about 1:2, or alternatively from about 1:4. In some embodiments, the $C_8$ to $C_{25}$ β-alkoxylated dimer alcohol comprises 2-butyloctanol, 2-hexyldecanol or a combination thereof.

In some embodiments, the surfactant blend comprises a cationic surfactant that forms a microemulsion in situ upon contact with a hydrocarbon fluid and exhibits detergency. Detergency refers to the ability to lift soil (oil or solid objects) from a surface by displacing it with chemical solutions. Herein such surfactant blends are termed Composition C. In some embodiments, Composition C comprises a combination of lauryl amidopropyl amine oxide and myristal amidopropyl amine oxide, a $C_{12}$-$C_{15}$ alkoxylated alcohol alkoxylated with EO, PO, or a combination thereof, a sorbitol-initiated polyol, a phenol formaldehyde resin with 10 mol % of ethoxylation or, a combination thereof. In some embodiments, the $C_{12}$-$C_{15}$ alkoxylated alcohol is alkoxylated with 9 moles of EO. In yet other embodiments, the $C_{12}$-$C_{15}$ alkoxylated alcohol is blocked to control oil/water wherein the blocked alcohol is a product of reacting a mixture of ethylene oxide and propylene oxide of varying concentrations and the product(s) is determined by entropic and electrophilic factors solubility.

In some embodiments, the surfactant blend comprises an anionic surfactant that forms a microemulsion in situ upon contact with a hydrocarbon fluid and exhibits detergency. Herein such surfactant blends are termed Composition D. In some embodiments, Composition D comprises the triethanolamine salt of dodecylbenzene sulfonate, the monoisopropyl amine salt of dodecylbenzene sulfonate, a $C_{12}$-$C_{15}$ alkoxylated alcohol alkoxylated with EO, PO, or a combination thereof. In some embodiments, the $C_{12}$-$C_{15}$ alkoxylated alcohol is alkoxylated with 9 moles of EO. In yet other embodiments, the $C_{12}$-$C_{15}$ alkoxylated alcohol is blocked to control oil/water wherein the blocked alcohol is a product of reacting a mixture of ethylene oxide and propylene oxide of varying concentrations and the product(s) is determined by entropic and electrophilic factors solubility.

The surfactant blend may be present in the treatment fluid in an amount of from about 0.01 wt. % to about 10 wt. %, alternatively from about 0.1 wt. % to about 5 wt. % or alternatively from about 0.5 wt. % to about 3 wt. % based on the total weight of the treatment fluid.

In some embodiments, the surfactant blend further comprises a solvent. The solvent may be an aqueous fluid, organic fluid, organic compounds (monomeric esters, dimeric esters, amides), glycol-based fluids, organic acid inorganic salts, organic acid organic salts, inorganic salts, organic salts or a combination thereof. In some embodiments, the solvent comprises an aqueous fluid. The aqueous fluid may comprise fresh water, salt water, deionized water, produced water, flowback water, brackish water, brine, seawater or a combination thereof. The aqueous fluid may comprise salt in an amount of less than about 40,000 ppm, alternatively from about 4,000 ppm to about 40,000 ppm or alternatively from about 2,000 ppm to about 20,000 ppm. The salt may be selected from the group consisting of sodium bromide, calcium chloride, calcium bromide, cesium bromide, zinc bromide, potassium chloride, sodium chloride, a carbonate salt, a sulfonate salt, a phosphate salt, a phosphonate salt, a magnesium salt, a bromide salt, a formate salt, an acetate salt, thiophosphate salts, phosphate salts, phosphonate salts, a nitrate salt and a combination thereof. The aqueous fluid may be present in the surfactant blend in an amount of from about 0.01 weight percent (wt. %) to about 99 wt. %, alternatively from about 0.05 wt. % to about 50 w.t % or alternatively from about 0.1 wt. % to about 10 wt. % based on the total weight of the surfactant blend or may comprise the rest of the surfactant blend when all other components are taken into account.

In some embodiments, the treatment fluids disclosed herein facilitate advantageous mineral dissolution at neutral pH inducing a favorable wettability modification of the formation surface by augmenting the pore connectivity. Herein the pH takes its standard definition as an indication for the acidity of a substance. The outcome of a pH-measurement is determined by a consideration between the number of $H^+$ ions and the number of hydroxide ($OH^-$) ions. When the number of $H^+$ ions equals the number of $OH^-$ ions, the fluid is neutral and then has a pH of about 7. The pH of the solution may be determined using any suitable methodology such as through the use of a pH electrode or indicator media.

Without wishing to be limited by theory, treatment fluids of the present disclosure, through advantageous dissolution at neutral pH and reducing any unwanted formation integrity issues, modifies the radius of curvature of the pore space (i.e., perturbs the denominator in the Young-LaPlace model). Modifying the radius of curvature of the pore space reduces the overall capillary pressures associated with the tight pores. The ability of the treatment fluid to increase dissolution of the reservoir surface at neutral pH can be obtained using any suitable methodology. For example, a stimulation brine can be introduced to the subterranean formation and the level of calcium in the recovered stimulation brine monitored as a function of time. An increase in the amount of calcium present in the stimulation brine overtime suggests the calcite rock is being dissolved. In some embodiments, a treatment fluid of the type disclosed herein results in dissolution of the reservoir rock surface at rate of from about 1 mg/L to about 50,000 mg/L, alternatively from about 1 mg/L to about 8000 mg/L, alternatively from about 10 mg/L to about 50,000 mg/L or, alternatively from about 50 mg/L to about 20,000 mg/L.

In some embodiments, the treatment fluid is characterized by the ability to form various types of emulsions upon contact with a water-immiscible fluid such as the hydrocarbon-based fluids found in a conventional reservoir. Herein conventional reservoir takes its meaning in the art and includes reservoirs comprising non-source rock, naturally-fractured, low porosity and, calcite rich reservoir rock.

For example, the treatment fluids disclosed herein may form an emulsion upon contact with a water-immiscible fluid. In some embodiments, the water-immiscible fluid is an oleaginous fluid, a hydrocarbon fluid, or a natural oil or a synthetic oil. For example, the water-immiscible fluid may comprise a $C_5$ to $C_{50}$ hydrocarbon, a terpene, d-limonene, a dipentene, a pinene, a terpene obtained from the essence of oranges, ethyl lactate, an oil of turpentine, isobutyl alcohol, liner or branched distillates, methyl-9-deonate, 1-dodecyl-2-pyrollidinone, dimethyl-2-methylglutarate, an ethoxylated, propoxylated terpene, N.N-dimethyl 9-decenamide, triethyl citrate, diethyl carbonate, n-methylpyrrolidone, an isoprene adduct, an isomer of an isoprene adduct, a $C_5$ to $C_{50}$ alkane, a $C_5$ to $C_{50}$ isoalkane, a $C_5$ to $C_{50}$ alkene, a silicone oil, a $C_1$ to $C_5$ alkyl ester of a substituted or unsubstituted $C_1$ to $C_{20}$ carboxylic acid or a combination thereof.

In some embodiments, the water-immiscible fluid comprises a hydrocarbon and the treatment fluid upon contact with the hydrocarbon-containing fluid forms a Type I Winsor emulsion, a Type II Winsor emulsion, a Type III Winsor emulsion or a Type IV Winsor emulsion. The treatment fluid may form a Type I Winsor emulsion where the surfactant is preferentially soluble in water and oil-in-water (o/w) microemulsions form. In a Type I Winsor emulsion, the surfactant-rich water phase coexists with the oil phase where surfactant is only present as monomers at small concentrations. The treatment fluid may form a Type II Winsor emulsion where the surfactant is mainly in the oil phase and a water-in-oil microemulsions form. In a Type II Winsor emulsion, the surfactant-rich oil phase coexists with the surfactant-poor aqueous phase. The treatment fluid may form a Type III Winsor emulsion which is a three-phase system where a surfactant-rich middle-phase coexists with both excess water and oil surfactant-poor phases. The treatment fluid may form a Type IV Winsor emulsion which is a single-phase (isotropic) micellar solution, that forms upon addition of a sufficient quantity of amphiphile.

In some embodiments of carrying out an EOR operation, the treatment fluid is placed into the subterranean formation via one or more injection wells and travels a distance into the subterranean formation in a direction of one or more recovery/production wells to aid in the mobilization and removal of hydrocarbons from the reservoir via the recovery/production wells. Placement of the treatment fluid into the one or more injection wells may occur using any suitable EOR methodology such as thermal injection, steam injection, steam flooding, or fire flooding (e.g., in situ combustion within the formation); gas (e.g., carbon dioxide, natural gas, or nitrogen) injection also referred to as miscible flooding; or chemical injection (e.g., water flooding with one or more chemical additives such as surfactants, polymers, alkaline or caustic agents, etc.). In various embodiments, EOR techniques of the type disclosed herein (e.g., formation flooding, surfactant flooding, continuous injection waterflooding, cyclic injection, etc.) can be used on reservoirs of the type disclosed herein (e.g., fractured carbonate reservoirs, sandstone reservoirs, unconventional reservoirs, fractured formations, high-contrast formations, etc.) using a treatment fluid of the type disclosed herein (e.g., a treatment fluid comprising ((i) an aminopolycarboxylic acid (APCA) comprising a phosphonoalkyl moiety and (ii) a surfactant blend).

In other embodiments, the methods disclosed herein utilize established or conventional EOR technologies which are implemented by injecting the treatment fluid through an injection well, displacing or forcing the treatment fluid through the reservoir (sweep treatment) where the treatment fluid contacts and mobilizes (sweeps) hydrocarbons in the formation, and extracting the hydrocarbon and said treatment fluid through one or more production wells. It is to be understood that the treatment fluid (e.g., aqueous treatment fluid) helps to drive hydrocarbon recovery, an effect known as "sweep." This effect is further improved by the use of viscous fluids, for example a treatment fluid of the type described herein comprising a polymer (and may be referred to as polymer flooding). In one or more embodiments, these viscous fluids can include polymers (partially hydrolyzed polyacrylamide, xanthan, etc.) and/or, surfactants such as Guerbet alcohols.

Any treatment fluid disclosed herein may be used in a continuous injection waterflood. For example, the treatment fluid may be continuously injected, under pressure, into reservoir rock formations via one or more injection wells (e.g., a plurality of injection wells). The injected treatment fluid may act to help maintain reservoir pressure and sweep through the formation located between the injection and one or more production/recovery wells (e.g., a plurality of production wells) from which the oil is recovered. As the injected treatment fluid sweeps through the formation toward the production wells, it forms a flood front (e.g., an interface between the injected fluid and the hydrocarbons being displaced ahead of it) that travels through the rock towards the production/recovery wells. A combination of reservoir hydrocarbons and treatment fluid is recovered from the production wells, for example continuously recovered from the production wells at a rate about equal to the continuous injection into the injection wells. In some embodiments, the treatment fluid injection and recovery of at least a portion of the treatment fluid by the production wells occurs about concurrently and about continuously (e.g., with no or minimal disruptions), for example over a period of equal to or greater than 1, 2, 3, or 4 weeks; 1, 2, 3, 4, 5, 6, 7, 8, 9, 10, 11, or 12 months; or 1, 2, 3, 4, 5, 6, 7, 8, 9, or 10 years, which may be referred to as continuous injection waterflooding. The treatment fluids of the present disclosure when used in continuous injection waterfloods advantageously (i) rapidly water wet the reservoir surface; (ii) reactively etch small layers/particles from the formation to improve sweep efficiency; (iii) are compatible with polymers if more viscosity is needed; (iv) enhance recovery of hydrocarbons from the subterranean formation, particularly in oil-wet formations; and (v) combinations of (i)-(iv).

In some embodiments, EOR comprises cyclic injection wherein the treatment fluid (e.g., an aqueous fluid or a foamed fluid containing chemical agents of the type described herein) is introduced to the subterranean formation via cyclic injection to enhance hydrocarbon recovery from the reservoir matrix. In cyclic injection, the treatment fluid is injected into one or more injection wells for a first period of time (an injection time interval), the injection is halted (and optionally the injected fluid is allowed to "soak" in the reservoir for a period of time (e.g., a soak time interval), and then fluid is recovered (e.g., treatment fluid and reservoir hydrocarbons are recovered) from one or more production wells for a second period of time (a production time interval). The injection, optional soak, and production periods of time combined constitute an injection/soak/production cycle, and the EOR process may comprise a plurality of sequential cycles that may be continuous or spaced apart by time periods such as minutes, hours, or days.

In yet other embodiments, EOR comprises cyclic injection using a treatment fluid of the type disclosed herein in combination with water or a foamed fluid to enhance hydrocarbon recovery from the reservoir matrix in a multi well scenario. Herein a multi well scenario refers to an operation where a plurality of wells in close proximity to each other are injected and produced in a pattern to help maintain reservoir pressure and enhance overall recovery from a larger reservoir utilizing multiple well interaction.

In some embodiments, a treatment fluid of the type disclosed herein can be used for carrying out an EOR under a non-fracturing injection mode. For example, the treatment fluid may be introduced to the formation through coiled tubing (CT) conveyed into the wellbore, and the fluid is introduced to the formation at a pressure below the fracturing pressure of the formation such that the formation is not fracturing during placement of the treatment fluid via the CT. CT refers to a continuous string of tubing, rolled onto a spool. CT is made from rolling strip material into a tubular form and resistance welding along its length. Upon its manufacturing, coiled tubing is rolled onto large spools with core diameters ranging from 8-12 feet. The strip material of CT is joined together using carefully controlled bias welding processes, such that the final string has no visible butt welds. Coiled tubing string outer diameters generally range from about 0.75-in to about 4.5-in. Coiled tubing material is essentially carbon steel, modified for grain size refinement.

Introduction of the treatment fluid to the formation via the CT provides the ability to quickly move in and out of the formation (or be quickly repositioned) when fracturing multiple zones in a single well. CT also provides the ability to facture or accurately spot (i.e., place) the treatment fluid to ensure complete coverage of the zone of interest. When used in conjunction with an appropriate diversion technique, more uniform treating of long target zones can be achieved. This is particularly useful in horizontal wellbores. In such embodiments (e.g., non-fracturing injection mode via CT), the treatment fluid may not be recovered and/or is not flowed back.

In some embodiments, continuous injection waterflooding with treatment fluids of the present disclosure is employed as an alternative to conventional Low Salinity Water (LSW) flooding technology. A low salinity water flood is very difficult to design due to its reliance on the formation and crude oil characteristics, and the need for specific and quality types or grades of water (base fluid). The treatment fluids of the present disclosure advantageously provide for fluids able to increase oil recovery while maintaining wellbore integrity. LSW fluids mobilize hydrocarbons from clay surfaces and utilize free clay fines as a viscosifier and diverter to improve sweep efficiency for the flood. However, a LSW having too low of a salinity will result in clay fines that block the reservoir pores whereas introduction of too high a salinity fluid will cause high surfaces to remain oil wet. The treatment fluids of the present disclosure when used in continuous injection waterfloods advantageously (i) rapidly water wet the reservoir surface; (ii) reactively etch small layers/particles from the formation to improve sweep efficiency; (iii) are compatible with polymers if more viscosity is needed; (iv) enhance recovery of hydrocarbons from the subterranean formation, particularly in oil-wet formations; and (v) combinations of (i)-(iv).

In some embodiments, a treatment fluid of the type disclosed herein is used under non-fracturing injection mode, such as (a) continuous injection floods as described herein or (b) via injection through CT deployed within one or more injection wells, in which case the injected fluid is not recovered and/or is not flowed back.

In other embodiments, established or conventional EOR technologies are implemented by injecting the treatment fluid through one or more injection wells, displacing or forcing the treatment fluid through the reservoir (sweeping the reservoir), and extracting the hydrocarbon and said treatment fluid through one or more production wells. It is understood that water helps to sweep that accompanies a "flood front" as the injectant travels through the formation located between the injection and production wells. This effect is further improved, necessarily, by the use of viscous fluids (e.g., polymers in what may be referred to a polymer flooding).

In some embodiments, a treatment fluid of the type disclosed herein is utilized as an alternative to Low Salinity Water (LSW) in a continuous injection waterflood operation. LSW are typically employed to compatibilize the salinity to below the brine content of the reservoir which may improve water wetting of the surface and mobilize hydrocarbons.

In some embodiments, a continuous injection waterflood with a treatment fluid of the type disclosed herein will be an improvement over traditional LSW. Without wishing to be limited by theory a treatment fluid of the type disclosed herein of the present disclosure may provide an improved imbibition into matrix. Further, even within tight pores a treatment fluid of the type disclosed herein is expected to have deeper transport of the fluids over a high or low-salinity brine and this deep penetration will better contact the reservoir.

In some embodiments, a treatment fluid comprising a surfactant blend and at least one phosphorous-containing material comprising a metallated diacetoaminophosphonate or a non-metallated diacetoaminophosphonate is introduced to a formation during an EOR process. In some embodiments, a Winsor TYPE IV microemulsion is formulated wherein the metallated phosphonate is "encapsulated" into a surfactant blend that may maximize its depth of penetration into the formation and matrix.

In some embodiments, the treatment fluids disclosed herein are used in any suitable wellbore servicing operation. For example, treatment fluids of the type disclosed herein may be used in a breakdown stage which may be carried out at an acidic pH; in a pad stage which can include a gelling agent, frac sand, proppant or a combination thereof; during alternating or cycling of one or more wellbore servicing fluids, during a displacement fluid stage or a combination thereof.

EXAMPLES

The presently disclosed subject matter having been generally described, the following examples are given as particular aspects of the subject matter and to demonstrate the practice and advantages thereof. It is understood that the examples are given by way of illustration and are not intended to limit the specification or the claims in any manner.

Example 1

The ability of a treatment fluid of the type disclosed herein to facilitate recovery of hydrocarbons was investigated. Spontaneous imbibition experiments entail the saturation of formation core plugs and submerging them in treatment brines. The percent hydrocarbon recovery is resultant from the efficacy of the experimental treatment brine.

Figure 2A:
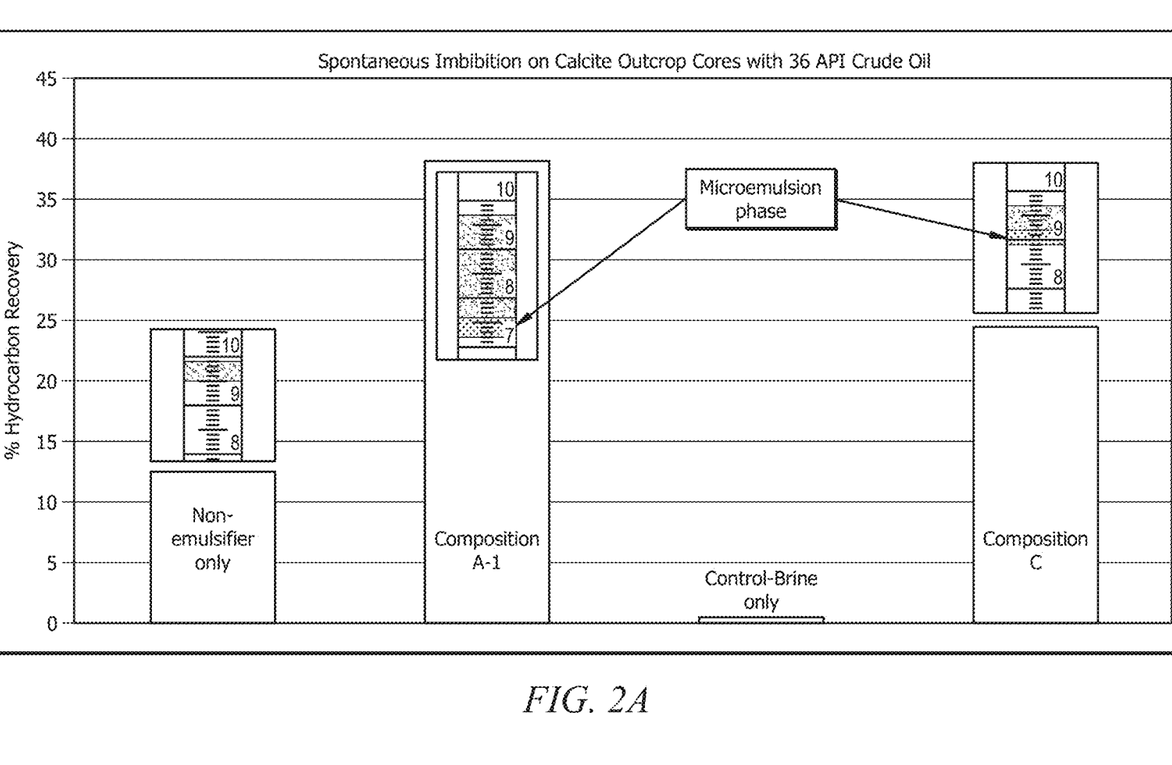
FIGS. 2A and 2B show the spontaneous imbibition results comparing the hydrocarbon recovery in mineralogically similar outcrop calcite cores with the same crude oil.
Figure 2B:
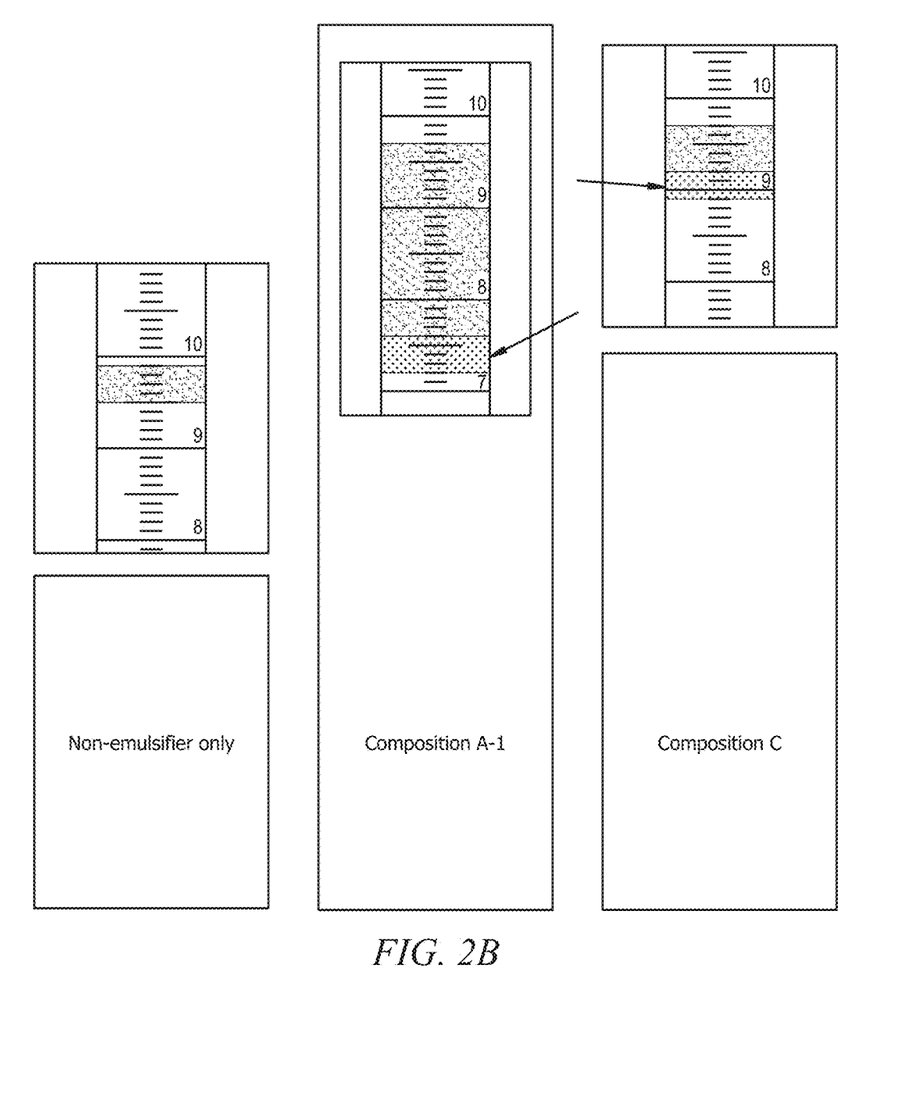

The initial wetting condition of the saturated core plug was determined by observing the amount of hydrocarbon displaced from the core in the absence of any surface modifying agents in the treatment brine (FIG. 2. Control). Because very little hydrocarbon had been displaced, the core condition was referred to as weakly water-wet. It can be generalized, given that the core and oil are identical for all four experiments shown in FIG. 2 that at the beginning of each experiment, the cores are all weakly water-wet.

The combination of the APCA comprising a phosphonoalkyl moiety with a surfactant blend that generates water in oil emulsions upon contact with crude oil, resulted in a significant increase in the amount of hydrocarbon recovered from the core. Data suggests that the APCA comprising a phosphonoalkyl moiety is responsible for the advantageous mineral dissolution providing fresh rock for the surfactant blend to stabilize (reduce the interfacial tension) the oil/water interface, thereby resulting in a larger percentage in hydrocarbon recovery. More evidence for this advantageous dissolution can be found in inductively couple plasma (ICP) analysis of the stimulation brine. ICP analysis of the stimulation found treatment fluids lacking an APCA comprising a phosphonoalkyl moiety also lacked calcium. However, treatment fluids of the present disclosure resulted in 1.3% of the total calcite being brought into solution.

Imaging experiments suggest the advantageous dissolution results in the connection of non-connected pores to the surface of the core plugs, allowing for significant enhancement of oil being displaced from the core. As shown in FIG. 2, laboratory data supported the novelty and observed efficacy of the combination of the surfactant blend and APCA comprising a phosphonoalkyl moiety.

Example 2

Figure 3:
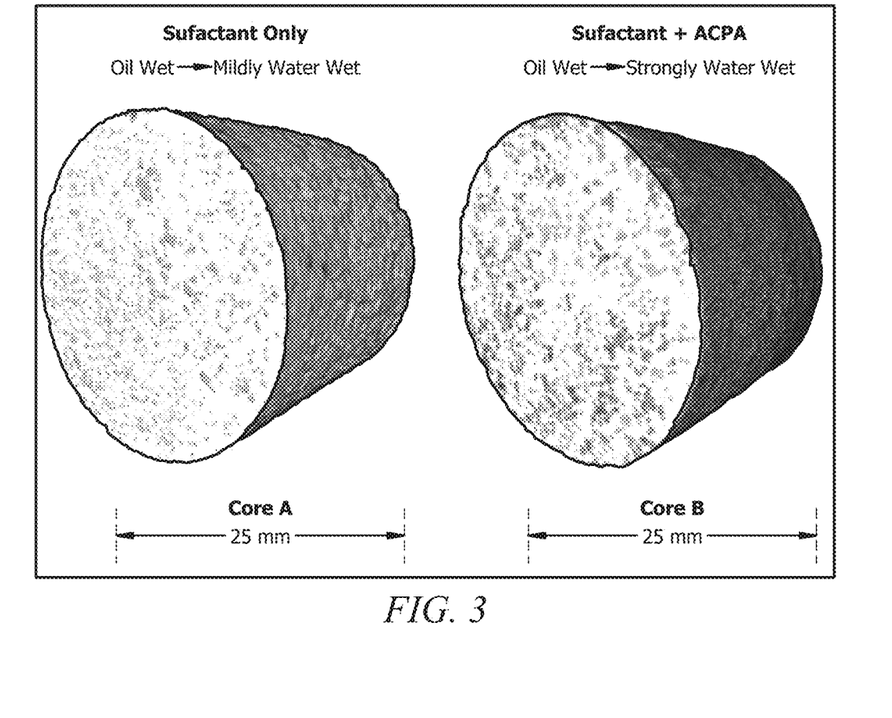
FIG. 3 illustrates the imaging post spontaneous imbibition studies with calcite rich cores.

The emulsion forming characteristics of the treatment fluids disclosed herein were investigated. Referring to FIG. 3, the combination of the surfactant blend capable of forming water-in-oil emulsions upon contact with crude oil, with an APCA comprising a phosphonoalkyl moiety results in a significant higher volume of contacted and produced pores within the rock volume. Micro computed tomography (MicroCT) imaging with digital segmentation was used to extrapolate the difference in porous and microporous structures within the cores. Initially these cores had around 6 mL pore volumes and approximately 10% of that volume was effectively connected to the surface through the native pore network. After testing in the brine and surfactant laden brine these cores retained the same surface connected effective pore volume.

The addition of an APCA comprising a phosphonoalkyl moiety gently etched away ~1.2% of the volume which leads to a 350% increase of surface connected volume. With reference to FIG. 3, production of oil from the surface connected pore volume involves converting the pore surface from oil-wet (to water-wet. Factoring in the surface connected volume, the surfactant's ability alters the wettability improved production 67% for surfactants alone. The synergistic effect of a surfactant blend with the APCA comprising a phosphonoalkyl moiety increased volume of connected porosity and the wettability efficiency to 96%. FIG. 3 shows the core produced using a surfactant laden brine (left) produced contained in the outermost layer of the core; while the core produced using the surfactant blend plus the APCA comprising a phosphonoalkyl moiety (right) produced oil from deeper resulting in significantly more oil.

Additional Disclosure—Part I

The following are non-limiting, specific embodiments in accordance and with the present disclosure:

A first embodiment which is a method of enhanced oil recovery comprising placing into a subterranean formation a treatment fluid comprising (i) an aminopolycarboxylic acid comprising a phosphonoalkyl moiety; and ii) an emulsion-forming mixture comprising a wetting agent.

A second embodiment which is the method of the first embodiment wherein the compound comprising an aminopolycarboxylic acid comprising a phosphonoalkyl moiety having the general formula where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom a cobalt atom, a nickel atom, a copper atom, a gallium atom, an indium atom, or a hydrogen atom; x is 1 to 6; y is 0 to 6; and z is 1-6.

A third embodiment which is the method of any of the first through second embodiments wherein the aminopolycarboxylic acid comprising a phosphonoalkyl moiety comprises —(phosphonomethyl) iminodiacetic acid (PMIDA) or salts thereof, N-(carboxymethyl)-N-(phosphonomethyl)glycine, glycine, N,N'-1,2-ethanediylbis(N-(phosphonomethyl), glyphosine, aminotrimethylene phosphonic acid, sodium aminotris(methylenephosphonate), N-(2-hydroxyethyl)iminobis (methylphosphonic acid), P,P'-((2-propen-1-ylimino)bis(methylene))bis-phosphonic acid, P,P',P'''-(nitrilotris(methylene))tris-(nitrilotris(methylene)) trisphosphonic acid, ((methylimino)dimethylene) bisphosphonic acid, phosphonic acid, P,P',P''',P''''-(oxybis(2,1-ethanediylnitrilobis(methylene))tetrakis-((propylimino) bis(methylene))diphosphonic acid, P,P',P''-(nitrilotris (methylene))tris-(ethylenedinitrilo)-tetramethylenephosphonic acid, ethylene-bis (nitrilodimethylene)tetraphosphonic acid, (ethylenebis (nitrilobis(methylene)))tetrakisphosphonic acid, tetrasodium tetrahydrogen (ethane-1,2-diylbis(nitrilobis (methylene)))tetrakisphosphonate, 6-(bis(phosphonomethyl) amino)hexanoic acid, (phenylmethyl)imino)bis(methylene)bisphosphonic acid, phosphonobutane tricarboxylic acid, 2-hydroxyphosphono dicarboxylic acid, or a combination thereof A fourth embodiment which is the method of any of the first through third embodiments wherein the aminopolycarboxylic acid comprising a phosphonoalkyl moiety further comprises a counteraction A fifth embodiment which is the method of the fourth embodiment wherein the countercation comprises a metal selected from the group consisting of lithium, sodium, potassium, rubidium, cesium, magnesium, calcium, strontium, barium, iron, manganese, cobalt, nickel, copper, gallium, indium, titanium, zirconium, antimony atom, bismuth, aluminum and a combination thereof.

A sixth embodiment which is the method of the fourth embodiment wherein the countercation comprises a nonmetal selected from the group consisting of hydrogen ions, ammonium ions, tetraalkylammonium ions, tetraalkylphosphonium ions, a mono-, di-, or tri-alkanolamine wherein the alkyl species of the alkanol functionality can be methyl-, ethyl-, an isomer of propyl or an isomer of butyl, a nucleophile, an electrophile, a Lewis acid, a Lewis base, a Bronsted acid, a Bronsted base, an adduct of a stable complex ion, an electron donor and a combination thereof.

A seventh embodiment which is the method of any of the first through sixth embodiments wherein the aminopolycarboxylic acid comprising a phosphonoalkyl moiety is present in an amount of from about 5 mg/L (0.05% wt.) to about 15,000 mg/L (15% wt.) based on the total weight of the treatment fluid.

An eighth embodiment which is the method of any of the first through seventh embodiments wherein the base fluid comprises an aqueous fluid.

A ninth embodiment which is the method of the eighth embodiment wherein the aqueous fluid comprises fresh water, salt water, deionized water, produced water, flowback water, brackish water, brine, seawater or a combination thereof.

A tenth embodiment which is the method of the eighth embodiment wherein the aqueous fluid comprises sodium bromide, calcium chloride, calcium bromide, cesium bromide, zinc bromide, potassium chloride, sodium chloride, a carbonate salt, a sulfonate sale, sulfite salts, a phosphate salt, a phosphonate salt, a magnesium salt, a bromide salt, a formate salt, an acetate salt, thiophosphate salts, a nitrate salt, a nitrite salt, an ammonium salt, or a combination thereof.

An eleventh embodiment which is the method of any of the first through tenth embodiments wherein the base fluid is present in an amount of from about 0.01 wt. % to about 99 wt. % based on the total weight of the treatment fluid.

A twelfth embodiment which is the method of any of the first through eleventh embodiments further comprising a surfactant.

A thirteenth embodiment which is the method of the twelfth embodiment wherein the surfactant comprises a Guerbet alcohol.

A fourteenth embodiment which is the method of the thirteenth embodiment wherein the Guerbet alcohol comprises a $C_8$ to $C_{25}$ β-alkoxylated dimer alcohol.

A fifteenth embodiment which is the method of the thirteenth embodiment wherein the $C_8$ to $C_{25}$ β-alkoxylated dimer alcohol comprises 2-butyloctanol, 2-hexyldecanol or a combination thereof.

A sixteenth embodiment which is the method of the twelfth embodiment wherein the surfactant further comprises a demulsifying surfactant.

A seventeenth embodiment which is the method of any of the first through sixteenth embodiments wherein the treatment fluid further comprises partially hydrolyzed polyacrylamide, terpolymers derived of monomers containing esters and amides of alcohols, alkoxylated alcohols, propoxylated alcohols, amines, alkyoxylated amines, propoxylated amines, alkyl amines, alkyl sulfonates, alkyl phosphonates, quaternary amines, alkylsilines, or a combination thereof.

An eighteenth embodiment which is the method of any of the first through seventeenth embodiments wherein the subterranean formation comprises a fractured formation, a high-contrast formation or both.

A nineteenth embodiment which is the method of any of the first through eighteenth embodiments wherein the treatment fluid is polymer-free.

A twentieth embodiment which is the method of any of the first through nineteenth embodiments wherein the treatment fluid comprises less than about 0.6 mol/L ethylenediaminetetraacetic acid (EDTA), diethylenetriaminepentaacetic acid (DTPA), glutamic acid di-acetate (GLDA), methylglycinediacetic acid (MGDA), ethylenediamine-N,N'-disuccinic acid (EDDS), hydroxyiminodisuccinic acid (HIDS), hydroxyethylethylenediaminetriacetic acid (HEDTA), pentasodium diethylenetriaminepentaacetate (Na$_5$DPTA, DPTA), pentapotassium diethylenetriaminepentaacetate (K$_5$DPTA, DPTA), diethylenetriaminepentaacetic acid (H$_5$DPTA, DPTA), N,N-diacetic acid, tetrasodium (GLDA Na$_4$), glutamic acid, β-alanine diacetic acid (β-ADA), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, hydroxyethyliminodiacetate (HEIDA), iminodiacetic acid (IDA), nitrilotriacetic acid (NTA), polyhydroxy carboxylic acids, citric acid, glycolic acid, lactic acid, maleic acid, gluconic acid, glucaric acid, salts thereof or a combination thereof.

A twenty-first embodiment which is the method of any of the first through twentieth embodiments wherein the pH of the treatment fluid ranges from about 6 to about 8.

A twenty-second embodiment which is a wellbore servicing composition comprising: i) an aminopolycarboxylic acid comprising a phosphonoalkyl moiety; and ii) an emulsion-forming mixture comprising a wetting agent.

A twenty-third embodiment which is the wellbore servicing composition of the twenty-second embodiment wherein the emulsion is a macroemulsion, a microemulsion, a nanoemulsion or a combination thereof.

A twenty-fourth embodiment which is the wellbore servicing composition of any of the twenty-second through twenty-third embodiments wherein the aminopolycarboxylic acid comprising a phosphonoalkyl moiety has the general formula where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom a cobalt atom, a nickel atom, a copper atom, a gallium atom, an indium atom, or a hydrogen atom; x is 1 to 6; y is 0 to 6; and z is 1-6.

A twenty-fifth embodiment which is the wellbore servicing composition of any of the twenty-second through twenty-fourth embodiments wherein the aminopolycarboxylic acid comprising a phosphonoalkyl moiety is characterized by Structure A twenty-sixth embodiment which is the wellbore servicing composition of any of the twenty-second through twenty-fifth embodiments wherein the aminopolycarboxylic acid comprising a phosphonoalkyl moiety comprises N-(phosphonomethyl) iminodiacetic acid (PMIDA) or salts thereof, N-(carboxymethyl)-N-(phosphonomethyl)glycine, glycine, N,N'-1,2-ethanediylbis(N-(phosphonomethyl), glyphosine, aminotrimethylene phosphonic acid, sodium aminotris(methylenephosphonate), N-(2-hydroxyethyl)iminobis(methylphosphonic acid), phosphonic acid, P,P'-((2-propen-1-ylimino)bis(methylene))bis-phosphonic acid, P,P',P"-(nitrilotris(methylene))tris-(nitrilotris(methylene))trisphosphonic acid, ((methylimino)-dimethylene)bisphosphonic acid, P,P',P''',P''''-(oxybis(2,1-ethanediylnitrilobis(methylene))tetrakis-((propylimino)bis(methylene))diphosphonic acid, P,P',P'''-(nitrilotris(methylene))tris-(ethylenedinitrilo)-tetramethylenephosphonic acid, ethylene-bis(nitrilodimethylene) tetraphosphonic acid, (ethylenebis(nitrilobis(methylene))) tetrakisphosphonic acid, tetrasodium tetrahydrogen (ethane-1,2-diylbis(nitrilobis(methylene)))tetrakisphosphonate, 6-(bis(phosphonomethyl) amino)hexanoic acid, (phenylmethyl)imino)bis(methylene)bisphosphonic acid, phosphonobutane tricarboxylic acid, 2-hydroxyphosphono dicarboxylic acid, or a combination thereof.

A twenty-seventh embodiment which is the wellbore servicing composition of any of the twenty-second through twenty-sixth embodiments wherein the aminopolycarboxylic acid comprising a phosphonoalkyl moiety further comprises a metal selected from the group consisting of lithium, sodium, potassium, rubidium, cesium, beryllium, magnesium, calcium, strontium, barium, chromium, iron, manganese, cobalt, nickel, copper, gallium, titanium, zirconium, an antimony, bismuth, aluminum and a combination thereof.

A twenty-eighth embodiment which is the wellbore servicing composition of any of the twenty-second through twenty-seventh embodiments wherein the aminopolycarboxylic acid comprising a phosphonoalkyl moiety further comprises a nonmetal selected from the group consisting of hydrogen ions, ammonium ions, tetraalkylammonium ions, tetraalkylphosphonium ions mono-, di-, or tri-alkanolamine; where the alkyl species of the alkanol functionality can be methyl-, ethyl-, an isomer of propyl or of butyl and a combination thereof.

A twenty-ninth embodiment which is the wellbore servicing composition of any of the twenty-second through twenty-eighth embodiments wherein the wetting agent comprises a sulfate-capped primary branched or secondary propoxylated alcohol, a polyethylene glycol-initiated polyol, an ethylene glycol derivative or a combination thereof.

A thirtieth embodiment which is the wellbore servicing composition of any of the twenty-second through twenty-ninth embodiments wherein the wetting agent comprises a diethanolamide of a tall oil fatty acid, a sorbitol-initiated polyol or combinations thereof.

A thirty-first embodiment which is the wellbore servicing composition of any of the twenty-second through thirtieth embodiments wherein the wetting agent comprises a $C_8$ to $C_{25}$ β-alkoxylated dimer alcohol.

A thirty-second embodiment which is the wellbore servicing composition of the twenty-thirty-first embodiment wherein the $C_8$ to $C_{25}$ β-alkoxylated dimer alcohol comprises an ethoxylate moiety, a propoxylate moiety or a combination thereof.

A thirty-third embodiment which is the wellbore servicing composition of any of the thirty-first through thirty-second embodiments wherein an amount of $C_8$ to $C_{25}$ β-alkoxylated dimer alcohol is adjusted to control a hydrophobicity of the emulsion-forming mixture.

A thirty-fourth embodiment which is the wellbore servicing composition of any of the thirty-first through thirty-third embodiments wherein the $C_8$ to $C_{25}$ β-alkoxylated dimer alcohol has an ethoxylate moiety present in an amount of from about 10 mole percent (mol. %) to about 90 mol % based on the total moles of the $C_8$ to $C_{25}$ β-alkoxylated dimer.

A thirty-fifth embodiment which is the wellbore servicing composition of any of the thirty-first through thirty-fourth embodiments wherein the $C_8$ to $C_{25}$ β-alkoxylated dimer alcohol has a propoxylate moiety present in an amount of from about 10 mole percent (mol. %) to about 90 mol % based on the total moles of the $C_8$ to $C_{25}$ β-alkoxylated dimer.

A thirty-sixth embodiment which is the wellbore servicing composition of any of the thirty-first through thirty-fifth embodiments wherein the $C_8$ to $C_{25}$ β-alkoxylated dimer alcohol has an ethoxylate moiety and a propoxylate moiety present in ratio of from about 4:1, alternatively from about 2:1, alternatively from about 1:1, alternatively from about 1:2 or alternatively from about 1:4.

A thirty-seventh embodiment which is the wellbore servicing composition of any of the thirty-first through thirty-sixth embodiments wherein the $C_8$ to $C_{25}$ β-alkoxylated dimer alcohol comprises 2-butyloctanol, 2-hexyldecanol or a combination thereof.

A thirty-eighth embodiment which is the wellbore servicing composition of any of the twenty-second through thirty-sixth embodiments wherein the wetting agent comprises an alkyl-branched alcohol, a linear alcohol or a combination thereof.

A thirty-ninth embodiment which is the wellbore servicing composition of the thirty-eighth embodiment wherein the alkyl-branched alcohol comprises an ethoxylate moiety, a propoxylate moiety or a combination thereof.

A fortieth embodiment which is the wellbore servicing composition of the thirty-eighth embodiment wherein the linear alcohol comprises an ethoxylate moiety, a propoxylate moiety or a combination thereof.

A forty-first embodiment which is the wellbore servicing composition of the thirty-eighth embodiment wherein the methyl-branched alcohol has an ethoxylate moiety and a propoxylate moiety present in a ratio of from about 4:1, alternatively from about 2:1, alternatively from about 1:1, alternatively from about 1:2 or alternatively from about 1:4.

A forty-second embodiment which is the wellbore servicing composition of the thirty-eighth embodiment wherein the linear alcohol has an ethoxylate moiety and a propoxylate moiety present in a ratio of from about 4:1, alternatively from about 2:1, alternatively from about 1:1, alternatively from about 1:2 or alternatively from about 1:4.

A forty-third embodiment which is the wellbore servicing composition of any of the twenty-second through forty-second embodiments wherein the wetting agent comprises a $C_{12}$-$C_{15}$ alkoxylated alcohol having about 9 moles of ethoxylate, an ethoxylated $C_{12}$-$C_{15}$ alcohol, a propoxylated $C_{12}$-$C_{15}$ alcohol, a combination of an ethoxylated $C_{12}$-$C_{15}$ alcohol and a propoxylated $C_{12}$-$C_{15}$ alcohol, a sorbitol-initiated polyol, a phenol formaldehyde resin with about 10 mol. % of ethoxylation or a combination thereof.

A forty-fourth embodiment which is the wellbore servicing composition of any of the twenty-second through forty-third embodiments wherein the wetting agent comprises a triethanolamine salt of dodecylbenzene sulfate, a monoisopropyl amine salt of dodecylbenzene sulfonate; a $C_{12}$-$C_{15}$ alkoxylated alcohol having about 9 moles of ethoxylate, a propoxylated $C_{12}$-$C_{15}$ alcohol, a combination of an ethoxylated $C_{12}$-$C_{15}$ alcohol and a propoxylated $C_{12}$-$C_{15}$ alcohol or a combination thereof.

A forty-fifth embodiment which is the wellbore servicing composition of any of the twenty-second through forty-fourth embodiments wherein the emulsion-forming mixture further comprises a solvent in an amount of from about 0.01 wt. % to about 50 wt. % based on the weight of the emulsion-forming mixture.

A forty-sixth embodiment which is the wellbore servicing composition of any of the twenty-second through forty-fifth embodiments wherein the emulsion-forming mixture further comprises water in an amount of from about 0.01 wt. % to about 60 wt. % based on the total weight of the emulsion-forming mixture.

A forty-seventh embodiment which is the wellbore servicing composition of any of the twenty-second through forty-sixth embodiments wherein the wetting agent is present in an amount of from about 0.01 wt. % to about 50 wt. % based on the total weight of the emulsion-forming mixture.

A forty-eighth embodiment which is the wellbore servicing composition of any of the twenty-second through forty-seventh embodiments wherein the aminopolycarboxylic acid comprising a phosphonoalkyl moiety is present in the wellbore servicing composition in an amount of from about 5 mg/L (0.05% wt.) to about 5,000 mg/L (5% wt.) and the emulsion-forming mixture is present in the wellbore servicing composition in an amount of from about 0.01 wt. % to about 5 wt. % based on the total weight of the wellbore servicing composition.

A forty-ninth embodiment which is the wellbore servicing composition of any of the twenty-second through forty-eighth embodiments further comprising an aqueous fluid.

A fiftieth embodiment which is the wellbore servicing composition of the forty-ninth embodiment wherein the aqueous fluid comprises fresh water, salt water, deionized water, produced water, flowback water, brackish water, brine, seawater or a combination thereof.

A fifty-first embodiment which is the wellbore servicing composition of the forty-ninth embodiment wherein the aqueous fluid comprises sodium bromide, calcium chloride, calcium bromide, cesium bromide, zinc bromide, potassium chloride, sodium chloride, a carbonate salt, a sulfonate sale, sulfite salts, a phosphate salt, a phosphonate salt, a magnesium salt, a bromide salt, a formate salt, an acetate salt, thiophosphate salts, phosphate salts, phosphonate salts, a nitrate salt or a combination thereof.

A fifty-second embodiment which is the wellbore servicing composition of any of the fifty-first through fifty-second embodiments wherein the aqueous fluid is present in an amount of from about 0.01 wt. % to about 99 wt. % based on the total weight of the wellbore servicing composition.

A fifty-third embodiment which is the wellbore servicing composition of any of the twenty-second through fifty-second embodiments further comprising a water-immiscible fluid.

A fifty-fourth embodiment which is the wellbore servicing composition of the fifty-third embodiment wherein the water-immiscible fluid is an oleaginous fluid, a hydrocarbon fluid, or a natural or synthetic oil.

A fifty-fifth embodiment which is the wellbore servicing composition of the fifty-third embodiment wherein the water-immiscible fluid comprises a $C_5$ to $C_{50}$ hydrocarbon, a terpene, d-limonene, a dipentene, a pinene, a terpene obtained from the essence of oranges, ethyl lactate, an oil of turpentine, isobutyl alcohol, liner or branched distillates, methyl-9-deonate, 1-dodecyl-2-pyrollidinone, dimethyl-2-methylglutarate, an ethoxylated, propoxylated terpene, N.N-dimethyl 9-decenamide, triethyl citrate, diethyl carbonate, n-methylpyrrolidone, an isoprene adduct, an isomer of an isoprene adduct, a $C_5$ to $C_{50}$ alkane, a $C_5$ to $C_{50}$ isoalkane, a $C_5$ to $C_{50}$ alkene, a silicone oil, a $C_1$ to $C_5$ alkyl ester of a substituted or unsubstituted $C_1$ to $C_{20}$ carboxylic acid or a combination thereof.

A fifty-sixth embodiment which is the wellbore servicing composition of any of the fifty-third through fifty-fifth embodiments wherein the water-immiscible fluid is present in an amount of from about 0.01 wt. % to about 99.9 wt. % based on the total weight of the wellbore servicing fluid.

A fifty-seventh embodiment which is the wellbore servicing composition of any of the twenty-second through fifty-seventh embodiments further comprising an alcohol.

A fifty-eighth embodiment which is the wellbore servicing composition of the fifty-seventh embodiment wherein the alcohol comprises from about 0.01 wt. % to about 5 wt. % based on the total weight of the wellbore servicing composition A fifty-ninth embodiment which is the wellbore servicing composition of any of the twenty-second through fifty-eighth embodiments wherein the composition has an about neutral pH.

A sixtieth embodiment which is a method of making the wellbore servicing composition of any of the twenty-second through fifty-ninth embodiments comprising simultaneously contacting (i) the aminopolycarboxylic acid comprising a phosphonoalkyl moiety, (ii) the emulsion-forming mixture comprising a wetting agent; (iii) the aqueous fluid, (iv) the water-immiscible fluid and (v) the alcohol to form the wellbore servicing composition, wherein the components (i) to (v) can be combined or contacted in any sequence.

A sixty-first embodiment which is a method of making the wellbore servicing composition of any of the twenty-second through sixtieth embodiments comprising contacting (i) the aminopolycarboxylic acid comprising a phosphonoalkyl moiety; (ii) the emulsion-forming mixture comprising a wetting agent and (iii) the aqueous fluid to form a first mixture; and contacting the first mixture with (iv) the water-immiscible fluid and (v) the alcohol to form the wellbore servicing composition.

A sixty-second embodiment which is a method of making the wellbore servicing composition of any of the sixtieth through sixty-first embodiments wherein the resultant wellbore servicing composition is an emulsion having one or more of the following characteristics: thermodynamically stable, optically transparent, isotropic dispersion of non-water miscible fluid and aqueous fluid, a micelle size ranging from 15 nm to 500 nm, and combinations thereof.

A sixty-third embodiment which is a method of servicing a wellbore comprising placing the wellbore servicing composition of any of twenty-second through sixty-second embodiments in a wellbore penetrating a subterranean formation.

A sixty-fourth embodiment which is the method of servicing a wellbore of the sixty-third embodiment wherein a capillary pressure in the formation is advantageously decreased subsequent to placement of the wellbore servicing fluid.

A sixty-fifth embodiment which is the method of any of the sixty-third through sixty-fourth embodiments wherein an interfacial tension between hydrocarbon and water in the formation is decreased by from about 50% to about 500% subsequent to placement of the wellbore servicing fluid.

A sixty-sixth embodiment which is the method of any of the sixty-fourth through sixty-fifth embodiments wherein a wettability in at least a portion of the formation is advantageously altered subsequent to placement of the wellbore servicing fluid.

A sixty-seventh embodiment which is the method of any of the sixty-fourth through sixty-sixth embodiments wherein a dissolution of mineral surfaces in the formation is enhanced subsequent to placement of the wellbore servicing fluid.

A sixty-eighth embodiment which is the method of any of the sixty-fourth through sixty-seventh embodiments wherein the wellbore servicing composition is placed in the wellbore as part of an enhanced oil recovery operation or a tertiary oil recovery technique.

A sixty-ninth embodiment which is the method of the sixty-eighth embodiment wherein during the enhanced oil recovery, the wellbore servicing fluid is placed into the subterranean formation via one or more injection wells and travels a distance into the subterranean formation in a direction of one or more recovery/production wells.

A seventieth embodiment which is the method of the sixty-eighth embodiment wherein the enhanced oil recovery comprises thermal injection such as steam injection, steam flooding, or fire flooding (e.g., in situ combustion within the formation); gas (e.g., carbon dioxide, natural gas, or nitrogen) injection also referred to as miscible flooding; or chemical injection (e.g., water flooding with one or more chemical additives such as surfactants, polymers, alkaline or caustic agents, etc.).

A seventy-first embodiment which is the method of the sixty-eighth embodiment where the EOR process comprises cyclic injection using water or a foamed fluid containing chemical agents to enhance hydrocarbon recovery from the reservoir matrix followed by production in a single well scenario.

A seventy-second embodiment which is the method of the sixty-eighth embodiment where the EOR process comprises cyclic injection using water or am foamed fluid containing chemical agents (PMIDA and variants thereof) to enhance hydrocarbon recovery from the reservoir matrix in a multi well scenario where wells in close proximity to each other are injected and produced in a pattern to help maintain reservoir pressure and enhance overall recovery from a larger reservoir utilizing multiple well interaction.

A seventy-third embodiment which is the method of the sixty-eighth through seventy-second embodiments wherein the formation is a conventional formation or reservoir.

A seventy-fourth embodiment which is the method of the seventy-third embodiment wherein the formation has one or more of the following characteristics: non-source rock, naturally-fractured, low porosity, calcite-rich reservoir rock, mixed-mineralogy or combinations thereof.

A seventy-fifth embodiment which is the method of the sixty-eighth through seventy-fourth embodiments wherein the formation is not a shale formation.

Additional Disclosure—Part II

The following are non-limiting, specific embodiments in accordance and with the present disclosure:

A first embodiment which is a method of enhanced oil recovery comprising placing into a subterranean formation a treatment fluid comprising (i) an aminopolycarboxylic acid comprising a phosphonoalkyl moiety; and ii) a surfactant blend.

A second embodiment which is the method of the first embodiment wherein the compound comprising an aminopolycarboxylic acid comprising a phosphonoalkyl moiety has a general formula where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom a cobalt atom, a nickel atom, a copper atom, a gallium atom, an indium atom, or a hydrogen atom; x is 1 to 6; y is 0 to 6; and z is 1-6.

A third embodiment which is the method of any of the first through second embodiments wherein the aminopolycarboxylic acid comprising a phosphonoalkyl moiety comprises N-(phosphonomethyl) iminodiacetic acid (PMIDA) or salts thereof, N-(carboxymethyl)-N-(phosphonomethyl) glycine, glycine, N,N'-1,2-ethanediylbis(N-(phosphonomethyl), glyphosine, aminotrimethylene phosphonic acid, sodium aminotris(methylenephosphonate), N-(2-hydroxyethyl)iminobis (methylphosphonic acid), phosphonic acid, P,P'-((2-propen-1-ylimino)bis(methylene))bis-phosphonic acid, P,P',P"-(nitrilotris(methylene))tris-(nitrilotris(methylene))trisphosphonic acid, ((methylimino)dimethylene) bisphosphonic acid, P,P',P",P'"-(oxybis(2,1-ethanediylnitrilobis(methylene))tetrakis-((propylimino)bis(methylene)) diphosphonic acid, P,P',P"-(nitrilotris(methylene))tris-(ethylenedinitrilo)-tetramethylenephosphonic acid, ethylene-bis(nitrilodimethylene)tetraphosphonic acid, (ethylenebis(nitrilobis(methylene)))tetrakisphosphonic acid, tetrasodium tetrahydrogen (ethane-1,2-diylbis(nitrilobis(methylene)))tetrakisphosphonate, 6-(bis(phosphonomethyl) amino)hexanoic acid, (phenylmethyl)imino)bis(methylene) bisphosphonic acid, phosphonobutane tricarboxylic acid, 2-hydroxyphosphono dicarboxylic acid, or a combination thereof.

A fourth embodiment which is the method of any of the first through third embodiments wherein the aminopolycarboxylic acid comprising a phosphonoalkyl moiety further comprises a counteraction.

A fifth embodiment which is the method the fourth embodiment wherein the countercation comprises a metal selected from the group consisting of lithium, sodium, potassium, rubidium, cesium, magnesium, calcium, strontium, barium, iron, manganese, cobalt, nickel, copper, gallium, indium, a titanium atom, a zirconium atom, an antimony atom, a bismuth atom, an aluminum atom and a combination thereof.

A sixth embodiment which is the method of the fourth embodiment wherein the countercation comprises a nonmetal selected from the group consisting of hydrogen ions, ammonium ions, tetraalkylammonium ions, tetraalkylphosphonium ions, a mono-, di-, or tri-alkanolamine wherein the alkyl species of the alkanol functionality can be methyl-, ethyl-, an isomer of propyl or an isomer of butyl, a nucleophile, an electrophile, a Lewis acid, a Lewis base, a Bronsted acid, a Bronsted base, an adduct of a stable complex ion, an electron donor and a combination thereof.

A seventh embodiment which is the method of any of the first through sixth embodiments wherein the aminopolycarboxylic acid comprising a phosphonoalkyl moiety is present in an amount of from about 0.01 wt. % to about 12 wt. % based on a total weight of the treatment fluid.

An eighth embodiment which is the method of any of the first through seventh embodiments wherein the surfactant blend forms an emulsion in situ upon contact with a hydrocarbon fluid.

A ninth embodiment which is the method of any of the first through eighth embodiments wherein the surfactant blend comprises a sulfate salt-capped secondary propoxylated alcohol, a polyethylene glycol-initiated polyol, an ethylene glycol additive, a dethanolamine of tall oil fatty acid, a sorbitol-initiated polyol or a combination thereof.

A tenth embodiment which is the method of the ninth embodiment wherein the surfactant blend forms a microemulsion.

An eleventh embodiment which is the method of any of the first through tenth embodiments wherein the surfactant comprises a Guerbet alcohol.

A twelfth embodiment which is the method of the eleventh embodiment wherein the Guerbet alcohol comprises a $C_8$ to $C_{25}$ β-alkoxylated dimer alcohol.

A thirteenth embodiment which is the method of the twelfth embodiment wherein the $C_8$ to $C_{25}$ β-alkoxylated dimer alcohol comprises an ethoxylate moiety, a propoxylate moiety or a combination thereof.

A fourteenth embodiment which is the method of the twelfth embodiment wherein the $C_8$ to $C_{25}$ β-alkoxylated dimer alcohol has an ethoxylate moiety present in an amount of from about 10 mole percent (mol. %) to about 90 mol % based on the total moles of the $C_8$ to $C_{25}$ β-alkoxylated dimer.

A fifteenth embodiment which is the method of the twelfth embodiment wherein the $C_8$ to $C_{25}$ β-alkoxylated dimer alcohol has a propoxylate moiety present in an amount of from about 10 mole percent (mol. %) to about 90 mol % based on the total moles of the $C_8$ to $C_{25}$ β-alkoxylated dimer.

A sixteenth embodiment which is the method of the twelfth embodiment wherein the $C_8$ to $C_{25}$ β-alkoxylated dimer alcohol has an ethoxylate moiety and a propoxylate moiety present in ratio of about 4:1.

A seventeenth embodiment which is the method of the twelfth embodiment wherein the $C_8$ to $C_{25}$ β-alkoxylated dimer alcohol comprises 2-butyloctanol, 2-hexyldecanol or a combination thereof.

An eighteenth embodiment which is the method of any of the first through seventeenth embodiments wherein the surfactant blend comprises lauryl amidopropyl amine oxide, myristal amidopropyl amine oxide, a $C_{12}$-$C_{15}$ alkoxylated alcohol, a sorbitol-initiated polyol, an ethoxylated phenol formaldehyde resin, or a combination thereof.

A nineteenth embodiment which is the method of any of the first through eighteenth embodiments wherein the surfactant blend comprises a triethanolamine salt of dodecylbenzene sulfonate, a monoisopropyl amine salt of dodecylbenzene sulfonate, a $C_{12}$-$C_{15}$ alkoxylated alcohol wherein the alkoxyl group comprises ethylene oxide, propylene oxide or both, or a combination thereof.

A twentieth embodiment which is the method of any of the first through nineteenth embodiments wherein the surfactant blend is present in the treatment fluid in an amount of from about 0.01 wt. % to about 10 wt. % based on the total weight of the treatment fluid.

A twenty-first embodiment which is the method of any of the first through twentieth embodiments wherein the treatment fluid further comprises an aqueous fluid.

A twenty-second embodiment which is the method of the twenty-first embodiment wherein the aqueous fluid comprises fresh water, salt water, deionized water, produced water, flowback water, brackish water, brine, seawater or a combination thereof.

A twenty-third embodiment which is the method of any of the first through twenty-second embodiments wherein the subterranean formation comprises non-source rock, naturally-fractured rock, low porosity rock, calcite rich reservoir rock or a combination thereof.

A twenty-fourth embodiment which is the method of the twenty-third embodiment further comprising contacting the treatment fluid with the non-source rock, naturally-fractured rock, low porosity rock, calcite rich reservoir rock or a combination thereof.

A twenty-fifth embodiment which is the method of the twenty-fourth embodiment wherein the contacting results in dissolution of from about 1 mg/L to about 8,000 mg/L percent of the non-source rock, naturally-fractured rock, low porosity rock, calcite rich reservoir rock or a combination thereof.

A twenty-sixth embodiment which is the method of the twenty-fourth through twenty-fifth embodiments wherein contacting occurs at a pH of from about 6 to about 9.

A twenty-seventh embodiment which is a method of enhanced oil recovery comprising introducing into one or more injection wells located within a subterranean formation a treatment fluid comprising (i) an aminopolycarboxylic acid comprising a phosphonoalkyl moiety; and ii) a surfactant blend; and removing hydrocarbons from one or more production wells.

A twenty-eighth embodiment which is a method of enhanced oil recovery comprising introducing into one or more injection wells located within a subterranean formation a treatment fluid comprising (i) an aminopolycarboxylic acid comprising a phosphonoalkyl moiety; and ii) a surfactant blend wherein the subterranean formation comprises non-source rock, naturally-fractured rock, low porosity rock, calcite rich reservoir rock or a combination thereof; and removing hydrocarbons from one or more production wells.

A twenty-ninth embodiment which is a method of enhanced oil recovery comprising injecting into one or more injection wells located within a subterranean formation a treatment fluid comprising (i) N-(phosphonomethyl) iminodiacetic acid; and ii) a Winsor-emulsion forming surfactant wherein the-(phosphonomethyl) iminodiacetic acid is present in an amount of from about 0.01 wt. % to about 12 wt. % based on a total weight of the treatment fluid; and removing hydrocarbons from one or more production wells.

The subject matter having been shown and described, modifications thereof can be made by one skilled in the art without departing from the spirit and teachings of the subject matter. The aspects described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as some embodiments of the present disclosure. Thus, the claims are a further description and are an addition to the aspects of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of enhanced oil recovery comprising:
    introducing into one or more injection wells located within a subterranean formation a treatment fluid comprising (i) an aminopolycarboxylic acid comprising a phosphonoalkyl moiety; and ii) a surfactant blend; and
    removing hydrocarbons from one or more production wells;
    wherein the aminopolycarboxylic acid comprising a phosphonoalkyl moiety has a general formula wherein $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom;
    $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkylamine, or a hydrogen atom;
    $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkylamine, or a hydrogen atom;
    $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom;
    $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom a cobalt atom, a nickel atom, a copper atom, a gallium atom, an indium atom, or a hydrogen atom;

x is 1 to 6;
y is 0 to 6; and
z is 1-6; and wherein the surfactant blend comprises:
(a) a sulfate salt-capped secondary propoxylated alcohol, a polyethylene glycol-initiated polyol, an ethylene glycol additive, a dethanolamine of tall oil fatty acid, a sorbitol-initiated polyol or a combination thereof,
(b) a Guerbet alcohol,
(c) lauryl amidopropryl amine oxide, myristal amidopropyl amine oxide, a C12-C15 alkoxylated alcohol, a sorbitol-initiated polyol, an ethoxylated phenol formaldehyde resin, or a combination thereof, or
(d) a triethanolamine salt of dodecylbenzene sulfonate, a monoisopropyl amine salt of dodecylbenzene sulfonate, a C12-C15 alkoxylated alcohol wherein the alkoxyl group comprises ethylene oxide, propylene oxide or both, or a combination thereof.

2. The method of claim 1, wherein the aminopolycarboxylic acid comprising a phosphonoalkyl moiety comprises N-(phosphonomethyl) iminodiacetic acid (PMIDA) or salts thereof, N-(carboxymethyl)-N-(phosphonomethyl)glycine, glycine, N,N'-1,2-ethanediylbis(N-(phosphonomethyl), glyphosine, aminotrimethylene sodium aminotris(methylenephosphonate), N-(2-hydroxyethyl)iminobis (methylphosphonic acid), phosphonic acid, P,P'-((2-propen-1-ylimino) bis(methylene))bis-phosphonic acid, P,P',P'''-(nitrilotris (methylene))tris-(nitrilotris(methylene))trisphosphonic acid, ((methylimino)-dimethylene)bisphosphonic acid, P,P',P''', P'''-(oxybis(2,1-ethanediylnitrilobis-(methylene))tetrakis-((propylimino)bis(methylene))diphosphonic acid, P,P',P''-(nitrilotris(methylene))tris-(ethylenedinitrilo)-tetramethylenephosphonic acid, ethylene-bis (nitrilodimethylene)tetraphosphonic acid, (ethylenebis (nitrilobis(methylene)))tetrakisphosphonic acid, tetrasodium tetrahydrogen (ethane-1,2-diylbis(nitrilobis (methylene)))tetrakisphosphonate, 6-(bis(phosphonomethyl) amino)hexanoic acid, (phenylmethyl)imino)bis(methylene)bisphosphonic acid, phosphonobutane tricarboxylic acid, 2-hydroxyphosphono dicarboxylic acid, or a combination thereof.

3. The method of claim 1, wherein the aminopolycarboxylic acid comprising a phosphonoalkyl moiety further comprises a counteraction.

4. The method of claim 3, wherein the countercation comprises a metal selected from the group consisting of lithium, sodium, potassium, rubidium, cesium, magnesium, calcium, strontium, barium, iron, manganese, cobalt, nickel, copper, gallium, indium, a titanium atom, a zirconium atom, an antimony atom, a bismuth atom, an aluminum atom and a combination thereof.

5. The method of claim 3, wherein the countercation comprises a nonmetal selected from the group consisting of hydrogen ions, ammonium ions, tetraalkylammonium ions, tetraalkylphosphonium ions, a mono-, di-, or tri-alkanolamine wherein the alkyl species of the alkanol functionality can be methyl-, ethyl-, an isomer of propyl or an isomer of butyl, a nucleophile, an electrophile, a Lewis acid, a Lewis base, a Bronsted acid, a Bronsted base, an adduct of a stable complex ion, an electron donor and a combination thereof.

6. The method of claim 1, wherein the aminopolycarboxylic acid comprising a phosphonoalkyl moiety is present in an amount of from about 0.01 wt. % to about 12 wt. % based on a total weight of the treatment fluid.

7. The method of claim 1, wherein the surfactant blend forms an emulsion in situ upon contact with a hydrocarbon fluid.

8. The method of claim 1, wherein the surfactant blend is (a) a sulfate salt-capped secondary propoxylated alcohol, a polyethylene glycol-initiated polyol, an ethylene glycol additive, a dethanolamine of tall oil fatty acid, a sorbitol-initiated polyol or a combination thereof.

9. The method of claim 8, wherein the surfactant blend forms a microemulsion.

10. The method of claim 1, wherein the surfactant blend is (b) a Guerbet alcohol.

11. The method of claim 10, wherein the Guerbet alcohol comprises a $C_8$ to $C_{25}$ β-alkoxylated dimer alcohol.

12. The method of claim 11, wherein the $C_8$ to $C_{25}$ β-alkoxylated dimer alcohol comprises an ethoxylate moiety, a propoxylate moiety or a combination thereof.

13. The method of claim 11, wherein the $C_8$ to $C_{25}$ β-alkoxylated dimer alcohol has an ethoxylate moiety present in an amount of from about 10 mole percent (mol. %) to about 90 mol % based on the total moles of the $C_8$ to $C_{25}$ β-alkoxylated dimer.

14. The method of claim 11, wherein the $C_8$ to $C_{25}$ β-alkoxylated dimer alcohol has a propoxylate moiety present in an amount of from about 10 mole percent (mol. %) to about 90 mol % based on the total moles of the $C_8$ to $C_{25}$ β-alkoxylated dimer.

15. The method of claim 11, wherein the $C_8$ to $C_{25}$ β-alkoxylated dimer alcohol has an ethoxylate moiety and a propoxylate moiety present in ratio of about 4:1.

16. The method of claim 11, wherein the $C_8$ to $C_{25}$ β-alkoxylated dimer alcohol comprises 2-butyloctanol, 2-hexyldecanol or a combination thereof.

17. The method of claim 1, wherein the surfactant blend is (c) lauryl amidopropryl amine oxide, myristal amidopropyl amine oxide, a C12-C15 alkoxylated alcohol, a sorbitol-initiated polyol, an ethoxylated phenol formaldehyde resin, or a combination thereof.

18. The method of claim 1, wherein the surfactant blend is (d) a triethanolamine salt of dodecylbenzene sulfonate, a monoisopropyl amine salt of dodecylbenzene sulfonate, a C12-C15 alkoxylated alcohol wherein the alkoxyl group comprises ethylene oxide, propylene oxide or both, or a combination thereof.

19. The method of claim 1, wherein the surfactant blend is present in the treatment fluid in an amount of from about 0.01 wt. % to about 10 wt. % based on the total weight of the treatment fluid.

20. The method of claim 1, wherein the treatment fluid further comprises an aqueous fluid.

21. The method of claim 20, wherein the aqueous fluid comprises fresh water, salt water, deionized water, produced water, flowback water, brackish water, brine, seawater or a combination thereof.

22. The method of claim 1, wherein the subterranean formation comprises non-source rock, naturally-fractured rock, low porosity rock, calcite rich reservoir rock or a combination thereof.

23. The method of claim 22, further comprising contacting the treatment fluid with the non-source rock, naturally-fractured rock, low porosity rock, calcite rich reservoir rock or a combination thereof.

24. The method of claim 23, wherein the contacting results in dissolution of from about 1 mg/L to about 8,000 mg/L percent of the non-source rock, naturally-fractured rock, low porosity rock, calcite rich reservoir rock or a combination thereof.

25. The method of claim 23, wherein contacting occurs at a pH of from about 6 to about 9.

26. The method of claim 1 wherein the aminopolycarboxylic acid comprising a phosphonoalkyl moiety comprises N-(phosphonomethyl) iminodiacetic acid or salts thereof.

27. A method of enhanced oil recovery comprising:
introducing into one or more injection wells located within a subterranean formation a treatment fluid comprising (i) an aminopolycarboxylic acid comprising a phosphonoalkyl moiety; and ii) a surfactant blend wherein the subterranean formation comprises non-source rock, naturally-fractured rock, low porosity rock, calcite rich reservoir rock or a combination thereof; and
removing hydrocarbons from one or more production wells;
wherein the aminopolycarboxylic acid comprising a phosphonoalkyl moiety has a general formula wherein $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom;
$R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkylamine, or a hydrogen atom;
$R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkylamine, or a hydrogen atom;
$R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom;
$R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom a cobalt atom, a nickel atom, a copper atom, a gallium atom, an indium atom, or a hydrogen atom;
x is 1 to 6;
y is 0 to 6; and
z is 1-6; and
wherein the surfactant blend comprises:
(a) a sulfate salt-capped secondary propoxylated alcohol, a polyethylene glycol-initiated polyol, an ethylene glycol additive, a dethanolamine of tall oil fatty acid, a sorbitol-initiated polyol or a combination thereof,
(b) a Guerbet alcohol,
(c) lauryl amidopropryl amine oxide, myristal amidopropyl amine oxide, a C12-C15 alkoxylated alcohol, a sorbitol-initiated polyol, an ethoxylated phenol formaldehyde resin, or a combination thereof, or
(d) a triethanolamine salt of dodecylbenzene sulfonate, a monoisopropyl amine salt of dodecylbenzene sulfonate, a C12-C15 alkoxylated alcohol wherein the alkoxyl group comprises ethylene oxide, propylene oxide or both, or a combination thereof.

28. A method of enhanced oil recovery comprising:
injecting into one or more injection wells located within a subterranean formation a treatment fluid comprising (i)N-(phosphonomethyl) iminodiacetic acid or salts thereof; and ii) a Winsor-emulsion forming surfactant wherein the N-(phosphonomethyl) iminodiacetic acid or salts thereof is present in an amount of from about 0.01 wt. % to about 12 wt. % based on a total weight of the treatment fluid; and removing hydrocarbons from one or more production wells, wherein the Winsor-emulsion forming surfactant comprises:
(a) a sulfate salt-capped secondary propoxylated alcohol, a polyethylene glycol-initiated polyol, an ethylene glycol additive, a dethanolamine of tall oil fatty acid, a sorbitol-initiated polyol or a combination thereof,
(b) a Guerbet alcohol,
(c) lauryl amidopropryl amine oxide, myristal amidopropyl amine oxide, a C12-C15 alkoxylated alcohol, a sorbitol-initiated polyol, an ethoxylated phenol formaldehyde resin, or a combination thereof, or
(d) a triethanolamine salt of dodecylbenzene sulfonate, a monoisopropyl amine salt of dodecylbenzene sulfonate, a C12-C15 alkoxylated alcohol wherein the alkoxyl group comprises ethylene oxide, propylene oxide or both, or a combination thereof.

* * * * *